(12) United States Patent
Nagase et al.

(10) Patent No.: US 7,240,761 B2
(45) Date of Patent: Jul. 10, 2007

(54) ELECTRIC POWER STEERING APPARATUS

(75) Inventors: Shigeki Nagase, Mie (JP); Masahiko Sakamaki, Nara (JP); Katsutoshi Nishizaki, Mie (JP); Toshiaki Oya, Osaka (JP); Takeshi Ueda, Nara (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 383 days.

(21) Appl. No.: 10/865,869

(22) Filed: Jun. 14, 2004

(65) Prior Publication Data
US 2004/0262074 A1 Dec. 30, 2004

(30) Foreign Application Priority Data
Jun. 12, 2003 (JP) ............... P.2003-167569

(51) Int. Cl.
*B62D 5/04* (2006.01)
*H02P 27/00* (2006.01)
*G05B 11/36* (2006.01)

(52) U.S. Cl. ............... 180/443; 180/446; 318/807; 318/609

(58) Field of Classification Search ......... 318/727, 318/254, 609, 610, 432, 798, 806, 807; 701/42; 180/443, 446
See application file for complete search history.

(56) References Cited

U.S. PATENT DOCUMENTS

| | | | | |
|---|---|---|---|---|
| 5,841,263 A | * | 11/1998 | Kaneko et al. | 318/807 |
| 5,969,500 A | * | 10/1999 | Ishikawa et al. | 318/807 |
| 6,008,617 A | * | 12/1999 | Kaneko et al. | 318/807 |
| 6,259,226 B1 | * | 7/2001 | Kaitani et al. | 318/798 |
| 6,344,726 B1 | * | 2/2002 | Tobari et al. | 318/727 |
| 6,462,492 B1 | * | 10/2002 | Sakamoto et al. | 318/254 |
| 6,670,786 B2 | * | 12/2003 | Tobari et al. | 318/805 |
| 6,700,400 B2 | * | 3/2004 | Atarashi | 324/772 |
| 6,841,968 B2 | * | 1/2005 | Sato et al. | 318/727 |
| 6,927,548 B2 | * | 8/2005 | Nishizaki et al. | 318/432 |

(Continued)

FOREIGN PATENT DOCUMENTS

CA 2 413 379 A1 6/2003

(Continued)

OTHER PUBLICATIONS

European Search Report dated Feb. 24, 2005.

*Primary Examiner*—Lesley D. Morris
*Assistant Examiner*—Daniel Yeagley
(74) *Attorney, Agent, or Firm*—McGinn IP Law Group PLLC (57) ABSTRACT

In a current control system for a cylindrical permanent magnet synchronous motor as the drive source of an electric power steering apparatus, proportional gain Kdp and integral gain Kdi of a d-axis current PI control portion 126 are respectively set to K1·Ld and K1·Rd on the basis of d-axis inductance Ld and d-axis resistance Rd of the motor. Further, proportional gain Kqp and integral gain Kqi of a q-axis current PI control portion 128 are respectively set to K2·Lq and K2·Rq on the basis of q-axis inductance Lq and q-axis resistance Rq of the motor (K1 and K2 are optional coefficients). In this case, both of the d-axis resistance Rd and the q-axis resistance Rq have values resulting from adding the external resistance R' including wiring resistance to the internal resistance R of the motor.

13 Claims, 8 Drawing Sheets

U.S. PATENT DOCUMENTS

| | | | |
|---|---|---|---|
| 6,984,948 B2* | 1/2006 | Nakata et al. | 318/254 |
| 7,009,349 B2* | 3/2006 | Nagase et al. | 318/133 |
| 7,047,116 B2* | 5/2006 | Ishikawa et al. | 701/22 |
| 7,075,266 B2* | 7/2006 | Tobari et al. | 318/807 |
| 7,084,591 B2* | 8/2006 | Kobayashi et al. | 318/254 |
| 2001/0005121 A1* | 6/2001 | Sakamaki | 318/727 |

FOREIGN PATENT DOCUMENTS

EP  1 220 439 A2  7/2002

* cited by examiner

RELATED ART

ELECTRIC POWER STEERING APPARATUS

BACKGROUND OF THE INVENTION

The present invention relates to an electric power steering apparatus for giving steering auxiliary power to the steering mechanism of a vehicle by a cylindrical permanent magnet synchronous motor as a brushless motor and a motor driving apparatus and more particularly to motor current control in such an electric power steering.

Electric power steering apparatus adapted for giving steering auxiliary power to steering mechanisms by driving electric motors in response to steering torque applied by drivers to handles (steering wheels) are used. As the electric motor (drive source) for use in the electric power steering apparatus, the motor with a brush has conventionally been used; however, the brushless motor such as a cylindrical permanent magnet synchronous motor is also employed in recent years in view of not only improving reliability and durability but also decreasing inertia. In the electric power steering apparatus in which the brushless motor is used, feedback control by a sine-wave electric current is performed as described hereunder.

The brushless motor normally essentially includes a rotor as a field system formed with a permanent magnet and a stator formed with a three-phase coil having U, V and W phases. In the drive control portion of the brushless motor, a voltage command value is calculated by proportional integral control operations so that an electric current having a target value that is set in response to steering torque flows through the motor and, based on the voltage command value, a sine wave voltage varying in a sine-wave form in response to the rotating position of the rotor is applied to the motor. The electric power steering apparatus is provided with a current control portion for controlling the motor current. In the current control portion, the voltage and the current as a three-phase AC current with respect to the driving of the motor are normally indicated by a rotary orthogonal coordinate system (called 'd-q coordinates') having a d-axis (also called an 'orthogonal axis') as the direction of magnetic flux of the field system of the rotor and a q-axis (also called an 'abscissa axis') that is perpendicular to the d-axis and leading the d-axis by $\pi/2$. With the d-q coordinates, the current made to flow through the motor can be treated as DC composed of a d-axis component and a q-axis component. In this case, the proportional integral control operations on the deviation of a target current value from the current actually flowing through the motor is carried out for each of the d-axis and q-axis components. A proportional gain and an integral gain for use in the proportional integral control operations are set on the basis of the inductance and internal resistance of the motor.

As saliency cannot be bypassed in the case of an embedded magnet synchronous motor, the d-axis quantity and the q-axis quantity of the reactance of the motor are treated separately (see Non-Patent Document 1, for example). When the embedded magnet synchronous motor is used in the electric power steering apparatus, it is necessary to carry out the proportional integral control operations based on the proportional gain and the integral gain differentiated by the d-axis component and the q-axis component of the motor current that should be kept under control.

In the case of a cylindrical permanent magnet synchronous motor, the rotor is a surface magneto structure with d-axis inductance as the d-axis quantity and q-axis inductance as the q-axis quantity of the reactance of the motor being substantially equal. Consequently, in the electric power steering apparatus using cylindrical permanent magnet synchronous motor, the proportional integral control operations is carried out on the assumption that an electrical time constant L/R as the ratio of the inductance L to the internal resistance R of the motor is set to the same value on the d-axis and the q-axis (absence of the saliency). Even in an electric power steering apparatus using a brushless motor having saliency with d-axis inductance different from q-axis inductance, moreover, the saliency can be disregarded because reluctance torque is obviated by controlling the application of voltage to the corresponding motor so that the d-axis component of the current flowing through the motor is reduced to zero.

Non-Patent Document 1

'Designing and Control of Embedded Magnet Synchronous Motor' by Youji Takeda et al 3, first edition, published by K. K. Ohmsha on Oct. 25, 2001

As set forth above, control of the motor current (to put it concretely, the proportional integral control operations for calculating the voltage command value) is performed on the assumption that the d-axis inductance and the q-axis inductance of the motor are equal in the electric power steering apparatus using the cylindrical permanent magnet synchronous motor.

However, it still remains unverified up to the present that the measurement of the d-axis inductance and the q-axis inductance of the motor has strictly been conducted and that the presence or absence of the difference between these factors of inductance has affected frequency characteristics of the current control in the electric power steering apparatus using the cylindrical permanent magnet synchronous motor. The present inventors looked into the foregoing problems and obtained FIG. 6 in the form of a Bode diagram showing the frequency characteristics of the q-axis current and FIG. 7 in the form of a Bode diagram showing the frequency characteristics of the d-axis current, whereby it was ascertained that there was an ignorable difference between the response of the d-axis current and that of q-axis current.

SUMMARY OF THE INVENTION

An object of the invention is to provide an electric power steering apparatus using a cylindrical permanent magnet synchronous motor and especially an electric power steering apparatus so designed that the original performance of a corresponding motor is fully brought out by matching the response of d-axis current with the response of q-axis current in the motor.

According to a first invention, an electric power steering apparatus with a cylindrical permanent magnet synchronous motor as a drive source for giving steering auxiliary power to the steering mechanism of a vehicle by introducing d-q coordinates as a rotary coordinate system having a d-axis as the direction of magnetic flux of the rotary field system of the motor and a q-axis perpendicular to the d-axis whereby to drive the motor according to values on the d-q coordinates of motor driving current command values determined in accordance with the operation intended for vehicle steering, comprises:

d-axis current control unit for calculating a d-axis voltage command value for driving the motor through control operations based on the d-axis component of the motor driving current command value;

q-axis current control unit for calculating a q-axis voltage command value for driving the motor through control operations based on the q-axis component of the motor driving current command value;

coordinate transformation unit for transforming the d-axis voltage command value and the q-axis voltage command value to voltage command values in the corresponding phases of the motor; and a motor driving circuit for driving the motor according to the voltage command values in the corresponding phases, wherein:

the control parameters of the d-axis current control unit are set on the basis of the d-axis inductance of the motor; and the control parameters of the q-axis current control unit are set on the basis of the q-axis inductance of the motor.

According to the first invention, unlike the related art in which current control is performed without distinguishing between the d-axis inductance and the q-axis inductance of the cylindrical permanent magnet synchronous motor, the d-axis current command value is calculated through the control operations based on the d-axis inductance, whereas the q-axis current command value is calculated through the control operations based on the q-axis inductance. Consequently, the performance of the motor can be brought out more than before by matching the frequency characteristics of the d-axis current with the frequency characteristics of the q-axis current in the current control system so as to make possible the current control fit for the motor characteristics.

According to a second invention, the electric power steering apparatus according to the first invention is such that:

the control parameters of the d-axis current control unit are set on the basis of the d-axis inductance of the motor and d-axis resistance as a d-axis quantity of the resistance of a motor-driving circuit system comprising the motor and the motor driving circuit;

the control parameters of the q-axis current control unit are set on the basis of the q-axis inductance of the motor and q-axis resistance as a q-axis quantity of the resistance of the motor-driving circuit system; and the d-axis resistance and the q-axis resistance are determined by the internal resistance of the motor and external resistance including wiring resistance of the motor as well as the motor driving circuit.

According to the second invention, in addition to performing the control operations for the current control by distinguishing between the d-axis inductance and the q-axis inductance, the control parameters used for the control operations are set in consideration of not only the internal resistance of the motor but also the external resistance including the wiring resistance. As the current control system is allowed to have frequency characteristics similar to the frequency characteristics of the motor-driving circuit system, the original performance of the motor can fully be brought out in the current control of the cylindrical permanent magnet synchronous motor and the response of the current control system can also be improved. Since the original performance of the motor can thus be brought out, the gain of the control unit for improving the response need not be increased unnecessarily and phase compensation also need not be effected unnecessarily, so that control sound and vibration are reduced.

According to a third invention, the electric power steering apparatus according to the second invention is such that:

the d-axis current control unit calculates the d-axis voltage command value by carrying out proportional integral control operations on the deviation of the d-axis component of the motor driving current command value from the d-axis component of the value of current flowing through the motor;

the q-axis current control unit calculates the q-axis voltage command value by carrying out proportional integral control operations on the deviation of the q-axis component of the motor driving current command value from the q-axis component of the value of current flowing through the motor; and a proportional gain Kdp and an integral gain Kdi as the control parameters of the d-axis current control unit, and a proportional gain Kqp and an integral gain Kqi as the control parameters of the q-axis current control unit are set in according with the following equation:

$$Kdp = K1 \cdot Ld,$$

$$Kdi = K1 \cdot Rd$$

$$Kqp = K2 \cdot Lq \text{ and}$$

$$Kqi = K2 \cdot Rq$$

where Ld=the d-axis inductance, Lq=the q-axis inductance, Rd=the d-axis resistance and Rq=the q-axis resistance with Rd=Rq=R+R' where R=the internal resistance, R'=the external resistance, and K1 and K2=optional coefficients.

According to the third invention, the d-axis voltage command value is calculated by the proportional integral control operations based on the d-axis inductance Ld and the d-axis resistance Rd including the external resistance R' and the q-axis voltage command value is calculated by the proportional integral control operations based on the q-axis inductance Lq and the q-axis resistance Rq including the external resistance R', whereby the original performance of the motor can fully be brought out in the current control of the cylindrical permanent magnet synchronous motor.

DETAILED DESCRIPTION OF PREFERRED EMBODIMENTS

<1. Basic Examinations>

In order to solve the problems in the current control system according to the related art, the related art and the contents of the related application for patent made by the present applicant have been subjected to basic examinations. The results of the basic examinations will be described by reference to the accompanied drawings before an embodiment of the invention is described. A cylindrical permanent magnet synchronous motor is to be employed as the drive source of an electric power steering apparatus hereinafter.

Figure 4:
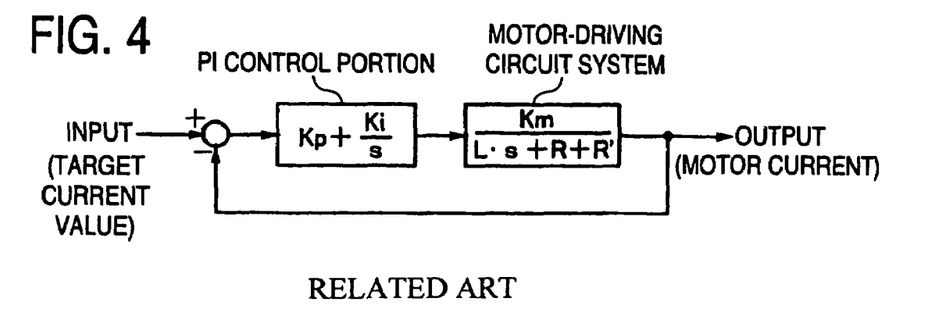
FIG. 4 is a block diagram of a current control system in a convention electric power steering apparatus, illustrated by using transfer functions.

FIG. 4 is a block diagram showing a current control system configuration in a related electric power steering apparatus. In this current control system, an electric current flowing through a motor forms an output and proportional integral control operations (hereinafter called the 'PI control operations') on the deviation of a target current value from the current flowing through the motor are carried out, the voltage obtained thereby being applied to the motor. In this case, the motor can be treated as a time-lag-of-first-order element determined by one phase of inductance L as well as resistance R and the transfer function can also be indicated by $K/(L \cdot s+R)$ (K is a constant). However, as there actually exists external resistance including wiring resistance of the motor and a motor driving circuit, with the motor driving circuit and the motor being treated as one transfer element (hereinafter called the 'motor-driving circuit system') in consideration of existence of the external resistance, the transfer function Gm(s) of the motor-driving circuit system is given by the following equation:

$$Gm(s)=Km/(L \cdot s+R+R') \quad (1)$$

where Km=constant and R'=external resistance including wiring resistance of the motor and the motor driving circuit.

On the other hand, a transfer function Gpi(s) indicating the PI control operation has heretofore been set as follows with the external resistance bypassed:

$$Gpi(s)=Kp+Ki/s \quad (2)$$

$$Kp=KO \cdot L \quad (3)$$

$$Ki=KO \cdot R \quad (4)$$

where Kp=proportional gain, Ki=integral gain and KO=any coefficient. When a brushless motor such as a cylindrical permanent magnet synchronous motor is used as the drive source, the PI control operations are carried out for a d-axis and a q-axis component of current to be made to flow through the motor as described above; however, the d-axis inductance and the q-axis inductance of the motor has heretofore been regarded as the same. Consequently, an electrical time constant L/R as the ratio of the proportional gain Kp to the integral gain Ki has been set to the same value in both cases of the control operations of the d-axis and q-axis components.

Figure 5:
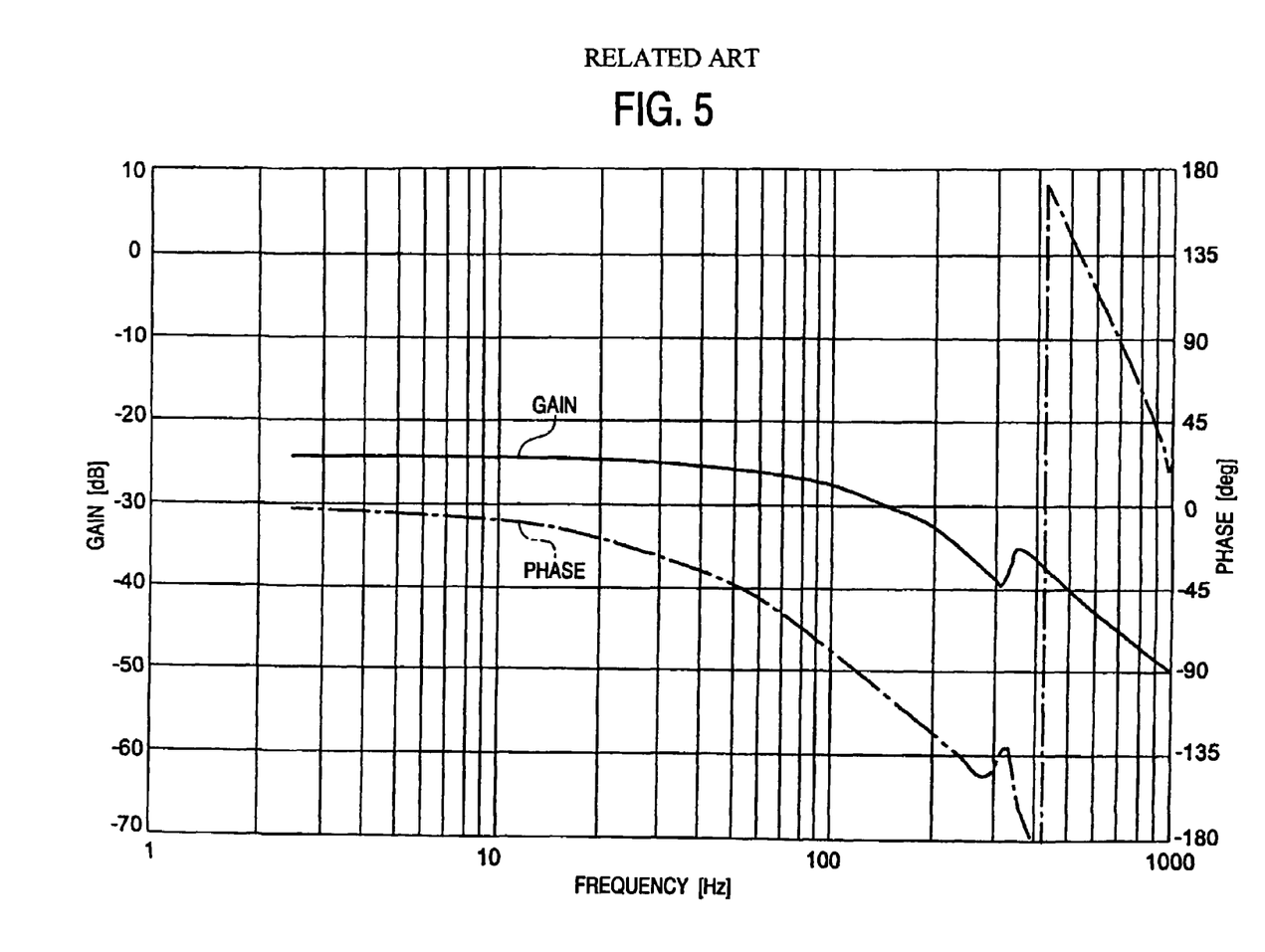
FIG. 5 is a Bode diagram showing frequency characteristics of the current control system in the conventional electric power steering apparatus.

FIG. 5 is a Bode diagram showing frequency characteristics of the closed loop current control system shown in FIG. 4 in the related current control. A curve shown by a solid line indicates gain characteristics, whereas a curve by a chain line indicates phase characteristics (the same applies to the following Bode diagram). As described in the specification of Application No. 2003-003655 (hereinafter refers to as the 'related art') for patent by the present applicant dated on Jan. 9, 2003, the related current control system like this failed to bring out the original performance of a motor. Accordingly, current control has been proposed in the related application so that the transfer functions of the PI control operations are set in consideration of the external resistance R' to bring out the original performance of such a motor. In the current control system like this, the transfer function Gpi(s) equivalent to the PI control operation is set as follows:

$$Gpi(s)=Kp+Ki/s \quad (5)$$

$$Kp=KO \cdot L \quad (6)$$

$$Ki=KO \cdot (R+R') \quad (7)$$

where Kp=proportional gain, Ki=integral gain and KO=any coefficient. With this arrangement, the closed loop transfer function Gcl (s) of the current control system is as follows:

$$Gcl(s)=Gpi(s) \cdot Gm(s)/\{1+Gpi(s) \cdot Gm(s)\}=KO \cdot Km/(s+KO \cdot Km) \quad (8)$$

In this case, if $KO \cdot Km=(R+R')/L$ is put, $$Gcl(s)=(R+R')/(Ls+R+R') \quad (9)$$

As is seen from a comparison between the transfer function Gcl(s) indicated by the equation (9) and the transfer function Gm(s) indicated by the equation (1), the current control system has similar frequency characteristics to those of the motor-driving circuit system (break frequencies being matched with each other). Thus, by designing the current control system in consideration of the external resistance R', it is possible not only to bring out the original performance of the motor but also to improve the response of the electric power steering apparatus.

Figure 6:
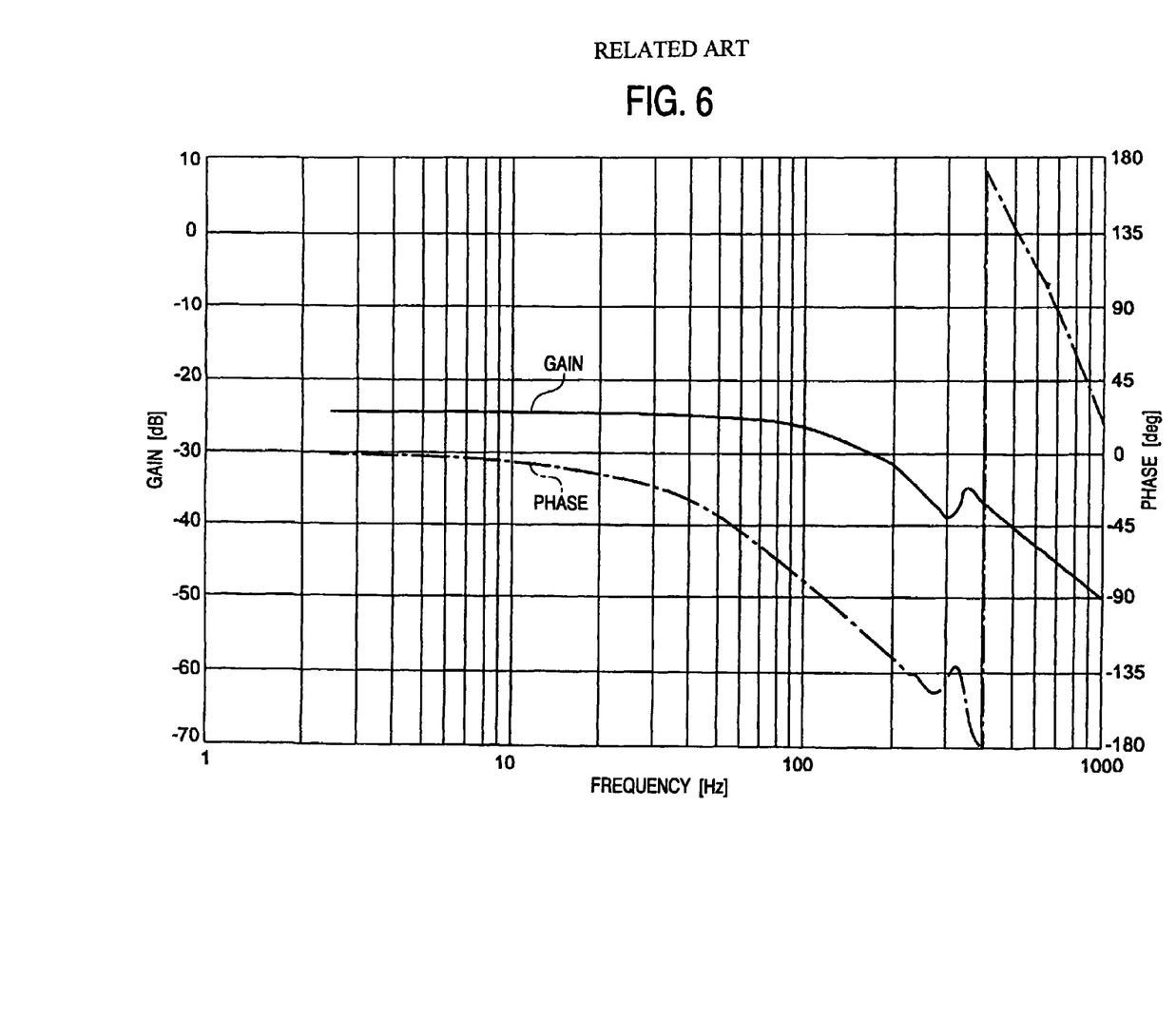
FIG. 6 is a Bode diagram showing frequency characteristics of q-axis current in the current control system of an electric power steering apparatus in the related application.
Figure 7:
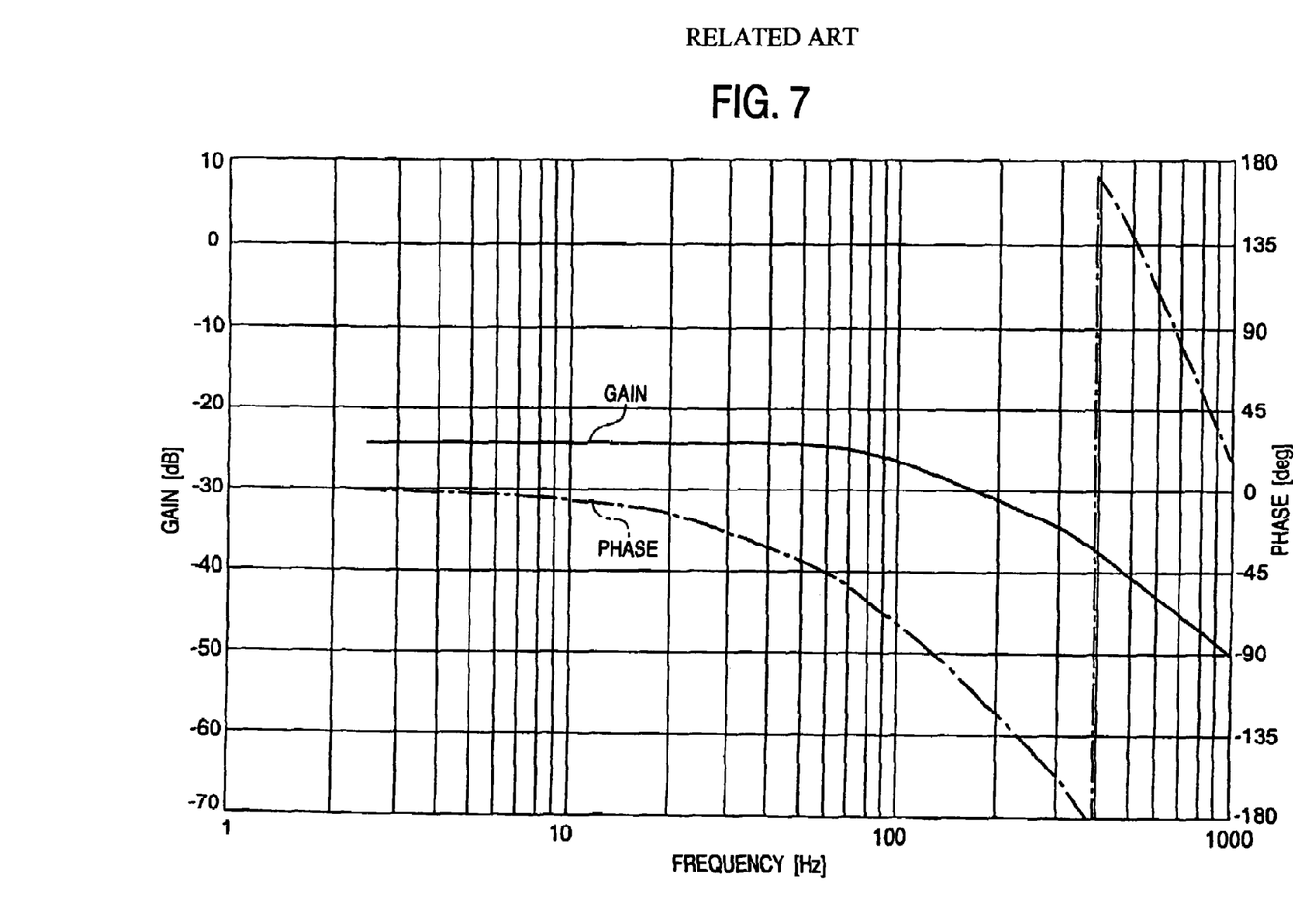
FIG. 7 is a Bode diagram showing frequency characteristics of d-axis current in the current control system of the electric power steering apparatus in the related application.

Incidentally, the d-axis inductance and q-axis inductance of the motor have been considered to be equal in the conventional current control and the current control disclosed in the related application with reference to the cylindrical permanent magnet synchronous motor. Frequency characteristics of the d-axis current as the d-axis component and those of the q-axis current as the q-axis component of the motor current were measured from the standpoint of the current control system based on the control method disclosed in the related application. A bode diagram as shown in FIG. 6 was obtained with respect to the q-axis current and a Bode diagram as shown in FIG. 7 was obtained with respect to the d-axis current. The measured results above show that regarding the d-axis inductance and the q-axis inductance as equal in the current control using the cylindrical permanent magnet synchronous motor is not necessarily appropriate. The measuring conditions were as follows; more specifically, the subject of this measurement is the current control system of a typical electric power steering apparatus using the cylindrical permanent magnet synchronous motor having a torque constant $K_T$, inductance Lm (the d-axis quantity and q-axis quantity of the inductance are regarded as the same), resistance Rm (including external resistance R'), a polar logarithm P and a constant φfp of counter electromotive force.

| | |
|---|---|
| Torque constant of motor: | $K_T = 8.00 \times 10^{-2}$-N·m/A-, |
| inductance of motor: | $Lm = 117.54 \times 10^{-6}$-H-, |
| resistance of motor: | $Rm = 3.0 \times 10^{-2}$-Ω- |
| polar logarithm of motor: | $P = 5$, |
| constant of counter electromotive force: | $\phi fp = 5.04 \times 10^{-2}$-V·s/rad-, |
| proportional gain of PI control portion: | $Kp = Lm \times (2\pi \times 75)$, and |
| integral gain of PI control portion: | $Ki = Rm \times (2\pi \times 75)$. |

When FIG. 6 is compared with FIG. 7, the frequency of the d-axis current is higher than that of q-axis current in the cutoff frequency and break frequency and the response to the q-axis current is different from that of the d-axis current. Though the difference in response exists therebetween, the control parameters (electrical constants of both axes) of the conventional PI control portion are the same, so that the original performance of the motor has not been brought out.

In the electric power steering apparatus according to the invention, the current control portion has been designed in consideration of the external resistance R', as well as the difference between the d-axis inductance and q-axis inductance of the motor in order to bring out the highest possible performance of the cylindrical permanent magnet synchronous motor as the drive source. The embodiment of the invention will now be described by reference to the accompanying drawings.

<2. Embodiment of the Invention>
<2.1 Overall Configuration>

Figure 1:
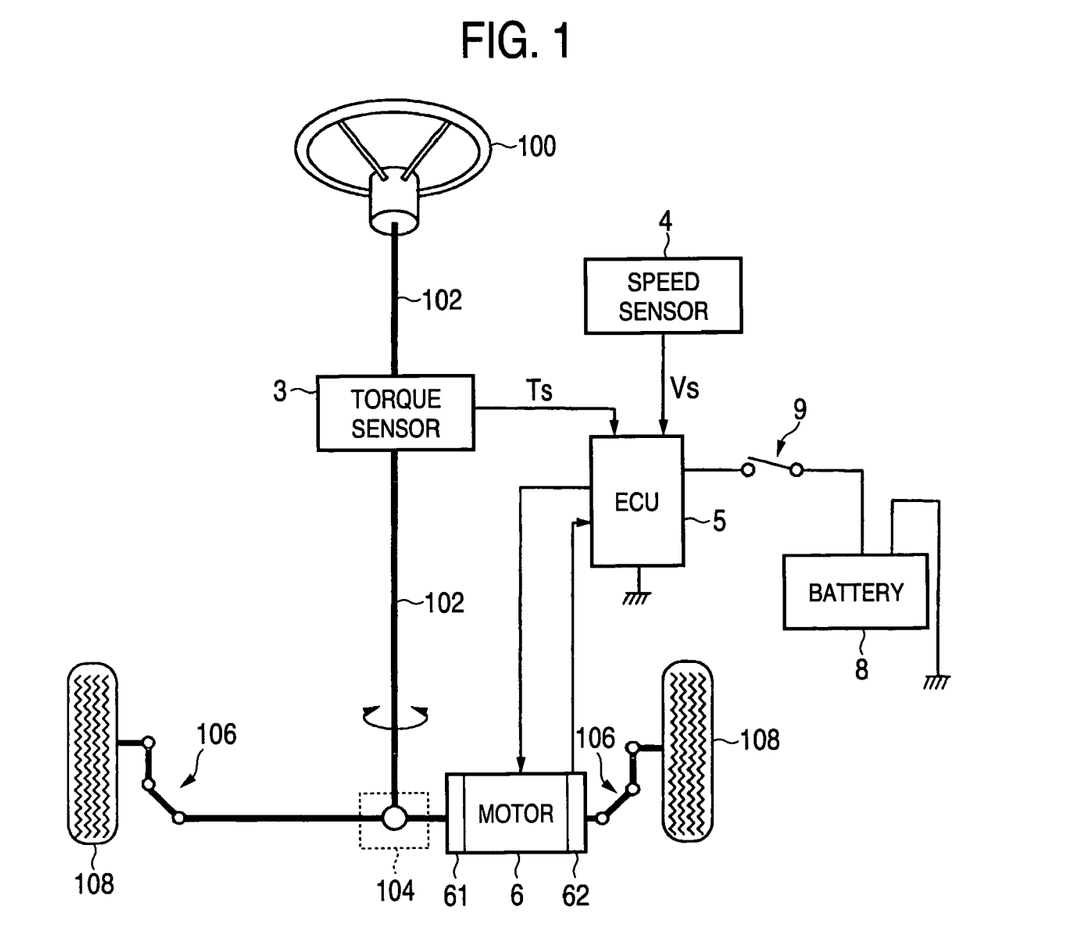
FIG. 1 is a schematic diagram showing an electric power steering apparatus configuration together with a relevant vehicle construction according to an embodiment of the invention.

FIG. 1 is a schematic diagram showing an electric power steering apparatus configuration together with a relevant vehicle construction according to the embodiment of the invention. The electric power steering apparatus comprises a steering shaft 102 with one end secured to a handle (steering wheel) 100 as a steering; a rack/pinion mechanism 104 coupled to the other end of the steering shaft 102; a torque sensor 3 for detecting steering torque applied to the steering shaft 102 by the use of the handle 100; a cylindrical permanent magnet synchronous motor 6 which is a brushless motor for generating steering auxiliary power for use in reducing a driver's load while the handle 100 is turning (steering); a ball screw driving portion 61 for transmitting the steering auxiliary power to a rack shaft; a position detection sensor 62 such as a resolver for detecting the rotating position of the rotor of the motor 6; and an electronic control unit (ECU) 5 for controlling the driving of the motor 6 according to sensor signals from the torque sensor 3, a speed sensor 4 and the position detection sensor 62 on receiving power from an on-board battery 8 via an ignition switch 9. When the driver operates the handle 100 in a vehicle loaded with the electric power steering apparatus, the torque sensor 3 detects steering torque resulting from turning the handle and outputs a steering torque signal Ts indicating the steering torque. On the other hand, the speed sensor 4 detects vehicle speed as the travel speed of the vehicle and outputs a speed signal Vs indicating the vehicle speed. The ECU 5 as a control unit includes the motor 6 driven according to the steering torque signal Ts, the speed signal Vs and the rotating position of the rotor detected by the position detection sensor 62. Accordingly, the motor 6 generates the steering auxiliary power, which is transmitted to the rack shaft via the ball screw driving portion 61, whereby the driver's load during the steering is reduced. In other words, the rack shaft makes reciprocal motion based on the sum of the steering force derived from the steering torque applied by the operation of the handle 100 and the steering auxiliary power generated by the motor 6. Both ends of the rack shaft are respectively coupled to wheels 108 via coupling members 106, each member having a tie rod and a knuckle arm. The direction of the wheels 108 is changed in response to the reciprocal motion of the rack shaft.

<2.2 Summary of Motor Control>

The motor 6 according to the embodiment of the invention is a cylindrical permanent magnet synchronous motor as a kind of brushless motor driven by sine waves and essentially consists of a rotor as a field system formed with a permanent magnet (hereinafter called the 'rotary field system') and a stator formed with a three-phase coil having U, V and W phases.

The target values of currents made to flow through the U-phase, V-phase and W-phase coils for generating suitable steering auxiliary power in the motor 6, that is, current command values in the corresponding phases are given by the equations below:

$$i^*_u = I^* \sin \theta re \quad (11a)$$

$$i^*_v = I^* \sin(\theta re - 2\pi/3) \quad (11b)$$

$$i^*_w = I^* \sin(\theta re - 4\pi/3) = -i^*_u - i^*_v \quad (11c)$$

where $i^*_u$=u-phase current command value, $i^*_v$=v-phase current command value, $i_w$=w-phase current command value and $\theta re$=angle of the rotary field system, taken clockwise with the u-phase coil as a reference (called the 'electrical angle') However, given that the mechanical angle of the rotor is set at $\theta m$ and the number of poles is set at $2p$, the electrical angle $\theta re = p \cdot \theta m$.

Although a voltage command value to be applied to the brushless motor is calculated by the control operations based on the deviation of the target current value from the detected motor current, the current command value is expressed with d-q coordinates in the control operations to decrease a phase lag and the calculation of the voltage command value is based on the d-and q-axis current command values. In this case, the d-q coordinates are the system of rotary coordinates rotated synchronously with the rotary field system (rotor) formed of the permanent magnet and the d-axis as the direction of magnetic flux of the field system, whereas the q-axis is in a direction perpendicular to the d-axis and leading the d-axis by $\pi/2$. Although the current command values $i^*_u, i^*_v$ and $i^*_w$ in the corresponding phases designate AC currents, the current command values according to the d-q coordinates designate direct currents.

The current command values in the corresponding phases expressed in the above equations (11a)–(11c) are expressed with the d-q coordinates as follows:

$$i^*_d = 0 \quad (12a)$$

$$i^*_q = -\sqrt{3/2} I^* \quad (12b)$$

where $i^*_d$=d-axis current command value and $i^*_q$=q-axis current command value.

When u- and v-phase currents are detected by a current detector with respect to the motor current, on the other hand, a d-axis current detection value $i_d$ and a q-axis current detection value $i_q$ are calculated from the detected results by the equations as follows:

$$i_d = \sqrt{2}\{i_v \sin \theta re - i_w \sin(\theta re - 2\pi/3)\} \quad (13a)$$

$$i_q = \sqrt{2}\{i_v \cos \theta re - i_w \cos(\theta re - 2\pi/3)\} \quad (13b)$$

where $i_v$=u-phase current detection value, $i_v$=v-phase current detection value and $\theta re$=the electrical angle above.

According to the embodiment of the invention, the motor 6 is subjected by a current control portion 200 which will be described later to feedback control so that the deviation $e_d = i^*_d - i_d$ of the command value $i^*_d$ from the detection value $i_d$ in the d-axis current and the deviation $e_q = i^*_q - i_q$ of the command value $i^*_q$ from the detection value $i_q$ in the q-axis current are canceled.

<2.3 Construction of Control Unit>

Figure 2:
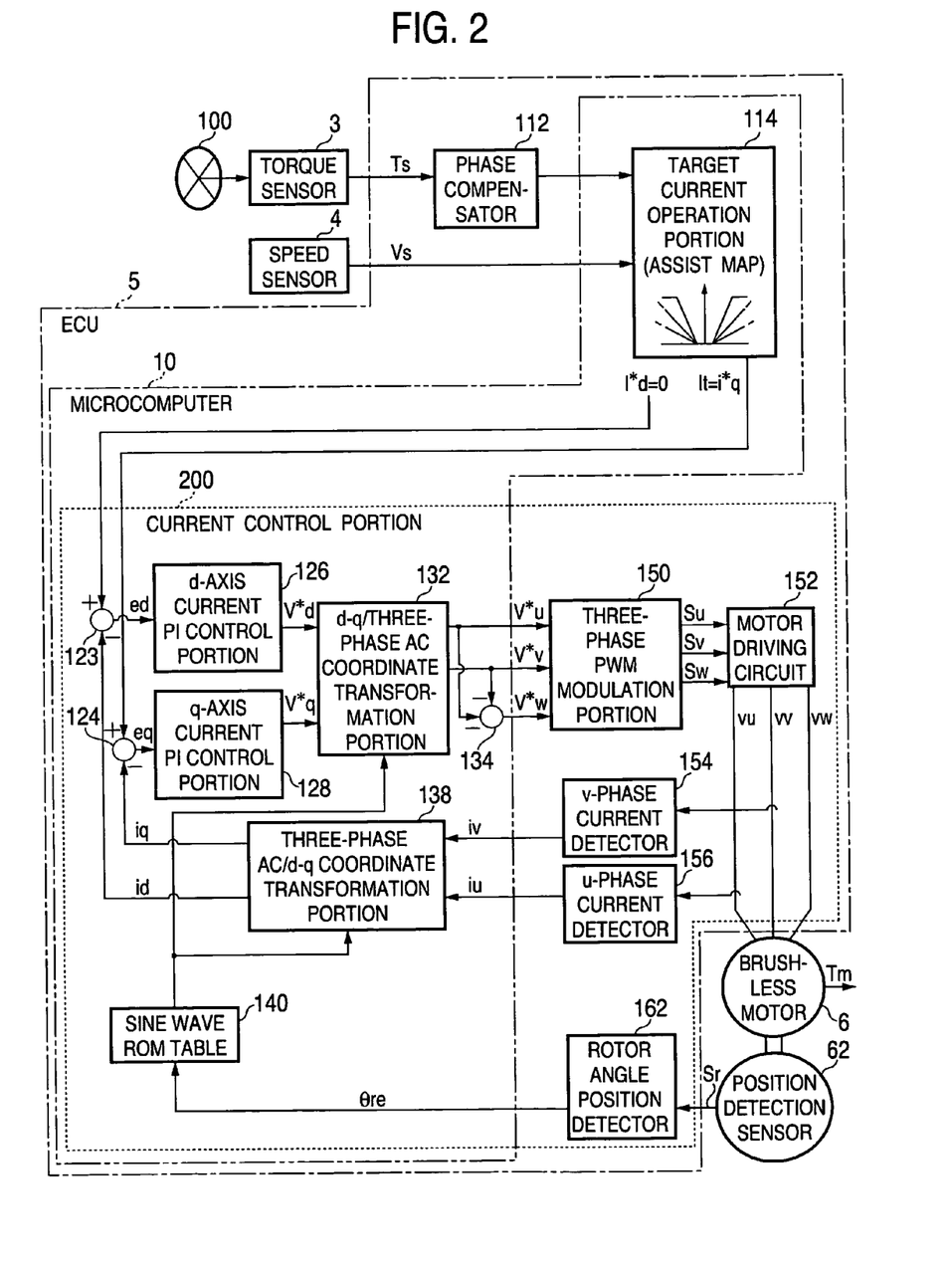
FIG. 2 is a block diagram showing a configuration of an ECU as a control unit in the electric power steering apparatus according to the embodiment of the invention.

In the ECU 5 as a control unit in the electric power steering apparatus according to the embodiment of the invention, the feedback control is performed for the motor 6. FIG. 2 is a block diagram showing the configuration of the ECU 5. The ECU 5 is formed with a phase compensator 112, a microcomputer 10 and a motor driving portion. The microcomputer 10 executes a predetermined program stored in an internal memory whereby to function as the motor control portion comprising a target current operation portion 114, subtractors 123 and 124, a d-axis current PI control portion 126, a q-axis current PI control portion 128, a d-q/three-phase AC coordinate transformation portion 132, a sign change adder 134, a three-phase AC/d-q coordinate transformation portion 138 and a sine wave ROM table 140. The motor driving portion is hardware (a circuit) for driving the cylindrical permanent magnet synchronous motor 6 as a three-phase brushless motor that consists of the u-phase, the v-phase and the w-phase based on the voltage command value output from the microcomputer 10 as the motor control portion, and comprises a three-phase PWM modulation portion 150, a motor driving circuit 152, a u-phase current detector 156, a v-phase current detector 154 and a rotor angle position detector 162. A component part for performing known compensating control is normally provided in the motor control portion implemented by the microcomputer 10 so as to improve steering operability; however, as the component part is not directly concerned with the invention, the description there of will be omitted.

According to the embodiment of the invention, the steering torque applied to the steering shaft 102 by the use of the handle 100 is detected and the steering torque signal Ts outputted from the torque sensor 3 is inputted into the ECU 5 thus arranged. Simultaneously, the traveling speed of the vehicle is detected by the speed sensor 4, and the speed Vs outputted from the speed sensor 4 is input into the ECU 5. The ECU 5 makes the phase compensator 112 subject the received steering torque signal Ts to phase compensation and the signal thus subjected to the phase compensation is fed into the target current operation portion 114. On the other hand, the speed signal Vs outputted from the speed sensor 4 is fed into the target current operation portion 114 in the ECU 5. Further, a sensor signal Sr output from the position detection sensor 62 fitted to the motor 6 is fed into the rotor angle position detector 162 in the ECU 5 and the rotor angle position detector 162 outputs a signal indicating the rotating position of the rotary field system (permanent magnet) which is the rotor of the motor 6 i.e., the electrical angle θre. The signal indicating the electrical angle θre is input into the sine wave ROM table 140.

The target current operation portion 114 determines a target current value It as the value of current to be supplied to the motor 6 on the basis of the steering torque signal Ts and the speed signal Vs. More specifically, a table (called the 'assist map') indicating the relation between the target value of the current to be supplied to the motor 6 and the steering torque with the vehicle speed as a parameter is held within the target current operation portion 114 beforehand. The target current operation portion 114 sets the target current value It by reference to the assist map. The target current value It indicates a current command value corresponding to the q-axis current given by the equation (12b) as described previously. Since the compensating control is omitted according to the embodiment of the invention, the target current value It is directly given as the q-axis current command value $i^*_q$ to the subtractors 124 in the current control portion 200; however, in the actual condition, a value resulting from adding a compensating current value for the compensating control to the target current value It is given as the q-axis current command value $i^*_q$ to the subtractor 124 in the current control portion 200. The q-axis current command value $i_q$ is a command value of current corresponding to torque to be generated by the motor 6 for steering assistance. In the meantime, the d-axis current command value $i^*_d$ is inputted as $i^*_d = 0$ into the subtractor 123 because the d-axis current is not involved in torque.

The u-phase current detector 156 and the v-phase current detector 154 detect u-phase current and v-phase current out of the current supplied to the motor 6 from the motor driving circuit 152 and output the u-phase current detection value $i_u$ and the v-phase current detection value $i_v$, respectively. The sine wave ROM table 140 stores various values of angle θ and sine θ by making these values correspond to one another and outputs the sin wave value sin θre corresponding to the electrical angle θre indicated by the signal from the rotor angle position detector 162. The three-phase AC/d-q coordinate transformation portion 138 employs the sine wave value sin θ reto convert the u-phase current detection value $i_u$ and the v-phase current detection value $i_v$ into d-q coordinate values, that is, the d-axis current detection value $i_d$ and the q-axis current detection value $i_q$ by means of the equations (13a) and (13b). The d-axis current detection value $i_d$ and the q-axis current detection value $i_q$ thus obtained are input into the respective subtractors 123 and 124.

The subtractor 123 calculates a d-axis current deviation $e_d = i^*_d - i_d$ as the deviation of the d-axis current command value $i^*_d$ from the d-axis current detection value $i_d$ by the three-phase AC/d-q coordinate transformation portion 138. The d-axis current PI control portion 126 obtains a d-axis voltage command value $v^*_d$ by the proportional integral control operations with respect to the d-axis current deviation $e_d$. On the other hand, the subtractor 124 calculates a q-axis current deviation $e_q = i^*_q - i_q$ as the deviation of the q-axis current command value $i^*_q$ from the q-axis current detection value $i_q$ by the three-phase AC/d-q coordinate transformation portion 138 and the q-axis current PI control portion 128 obtains a q-axis voltage command value $v^*_q$ by the proportional integral control operations with respect to the q-axis current deviation $e_q$.

The d-q/three-phase AC coordinate transformation portion 132 converts the d-axis voltage command value $v^*_d$ and the q-axis voltage command value $v^*_q$ to the u-phase voltage command value $v_u$ and the v-phase voltage command value $v^*_v$ as those on the three-phase AC coordinates. Further, the sign change adder 134 calculates a w-phase voltage command value $v^*_w$ from those phase voltage command value $v^*_u$ and $v^*_v$.

The three-phase PWM modulation portion 150 forms PWM signals Su, Sv and Sw of the duty ratios corresponding to the voltage command values $v^*_u$, $v^*_v$ and $v^*_w$ in the corresponding phases thus calculated.

The motor driving circuit 152 is a PWM voltage type invertor arranged by using switching elements such as power MOS transistors or the like, for example, and by turning on/off the respective switching elements by means of the PWM signals Su, Sv and Sw, generates voltages $v_u$, $v_w$ and $v_w$ in the corresponding phases to be applied to the motor 6. These phase voltage $v_u$, $v_v$ and $v_w$ are output from the ECU 5 before being applied to the motor 6. Thus, the currents are caused to flow through the coils (not shown) of the motor 6 in the u, v and w phases because of the voltage application, so that the motor 6 generates torque Tm for steering assistance in proportion to the currents.

Of the currents flowing through the motor 6, the u-phase current $i_u$ and the v-phase current $i_v$ are detected by the u-phase current detector 156 and the v-phase current detector 154 and converted by the three-phase AC/d-q coordinate transformation portion 138 into the current values $i_d$ and $i_q$ on the d-q coordinates. Of the current values $i_d$ and $i_q$ on the d-q coordinates, the d-axis current detection value $i_d$ is input into the subtractor 123, whereas the q-axis current detection value $i_q$ is input into the subtractor 124. In order to have the desired steering auxiliary power generated by the motor 6, the feedback control (called the 'current control') is performed so that the d-axis current detection value $i_d$ becomes equal to the d-axis current command value $i^*_d$ and that the q-axis current detection value $i_q$ becomes equal to the q-axis current command value $i^*_q$.

<2.4 Current Control System>

According to the embodiment of the invention, the target value of the motor current is set so that proper steering assistance is provided in response to the steering torque and the vehicle speed and the feedback control is performed so that the current of the target value (d-axis current command value $i^*_d$ and q-axis current command value $i^*_q$) is made to flow through the motor 6. The portion 200 where the current control is performed (hereinafter called the 'current control portion) in the ECU 5 corresponds to the portion enclosed with a dotted line. According to the embodiment of the invention, a portion corresponding to the motor driving portion out of the current control portion 200 as a means of controlling the driving of the motor 6 has been materialized in view of hardware. In any other portion than what corresponds to the motor driving portion, the microcomputer 10 has been materialized in view of software. Consequently, the current control system having the feedback group is formed with the current control portion 200, the motor 6 and the position detection sensor 62.

Figure 3A:
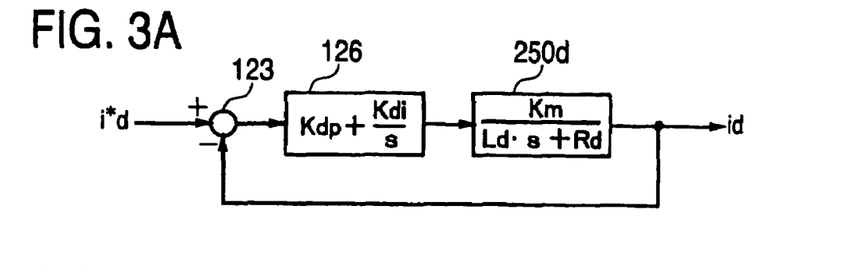
FIGS. 3A and 3B are block diagrams of a current control system illustrated by using transfer functions according to the embodiment of the invention.
Figure 3B:
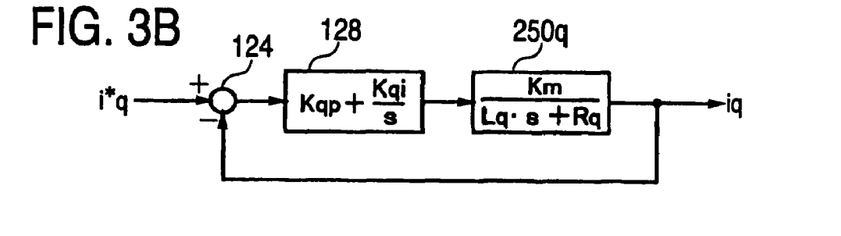

FIG. 3A is a block diagram illustrating the mechanism of the d-axis current in the current control system using the transfer function; and FIG. 3B, a block diagram illustrating the mechanism of the q-axis current in the current control system using the transfer function. Of the transfer elements shown in these block diagrams, the same reference numeral is attached to what corresponds to the component shown in FIG. 2. In these block diagrams, the motor-driving circuit system comprising the motor 6 and the motor driving circuit 152 is treated as one transfer element and the transfer element of the motor-driving circuit system with respect to the d-axis current (hereinafter called the 'd-axis motor-driving circuit system') is referred to by reference numeral '250*d*', whereas the transfer element of the motor-driving circuit system with respect to the q-axis current (hereinafter called the 'q-axis motor-driving circuit system') is referred to by reference numeral '250*q*'. As shown in FIGS. 3A and 3B, the transfer function Gdm(s) of the d-axis motor-driving circuit system 250*d* and the transfer function Gqm(s) of the q-axis motor-driving circuit system 250*q* are given by equations as follows:

$$Gdm(s)=Km/(Ld \cdot s+Rd) \tag{18}$$

$$Gqm(s)=Km/(Ld \cdot s+Rq) \tag{19}$$

where Km=constant, Ld=d-axis inductance of the motor-driving circuit system, Rd=d-axis resistance of the motor-driving circuit system, Lq=q-axis inductance of the motor-driving circuit system and Rq=q-axis resistance of the motor-driving circuit system. A specific method of obtaining Ld, Rd, Lq and Rq will be described in detail later. The d-axis resistance Rd and the q-axis resistance Lq are equal and include external resistance R'. Incidentally, the d-axis inductance of the motor-driving circuit system is equal to the d-axis inductance of the motor 6 and the q-axis inductance of the motor-driving circuit system is equal to the q-axis inductance of the motor 6.

Given that Kdp designates the proportional gain and that Kdi designates the integral gain, the transfer function Gdpi (s) of the d-axis current PI control portion 126 is given by the following equation (see FIG. 3A):

$$Gdpi(s)=Kdp+Kdi/s \tag{20}$$

Given that Kqp designates the proportional gain and that Kqi designates the integral gain, the transfer function Gqpi (s) of the q-axis current PI control portion 128 is given by the following equation (see FIG. 3B):

$$Gqpi(s)=Kqp+Kqi/s \tag{21}$$

According to the embodiment of the invention, the setting of the proportional gain Kdp and the integral gain Kdi as the control parameters of the d-axis current PI control portion 126 is based on the d-axis inductance Ld and the d-axis resistance Rd as follows:

$$Kdp=K1 \cdot Ld \tag{22}$$

$$Kdi=K1 \cdot Rd \tag{23}$$

where K1=any coefficient. Further, the setting of the proportional gain Kqp and the integral gain Kqi as the control parameters of the q-axis current PI control portion 128 is based on the q-axis inductance Lq and the q-axis resistance Rq as follows:

$$Kqp=K2 \cdot Lq \tag{24}$$

$$Kqi=K2 \cdot Rq \tag{25}$$

where K2=any coefficient.

In the current control system above, a closed loop transfer function Gdcl (s) for the d-axis current is given by reference to FIG. 3A and by the equations (18), (20), (22) and (23).

$$Gdcl(s)=Gdpi(s) \cdot Gdm(s)/\{1+Gdpi(s) \cdot Gdm(s)\}=K1 \cdot Km/(s+K1 \cdot Km) \tag{26}$$

In this case, if K1·Km=Rd/Ld is put, $$Gdcl(s)=Rd/(Ld \cdot s+Rd) \tag{27}$$

As is seen from a comparison between the equations (27) and (18), the current control system has similar frequency characteristics to those of the motor-driving circuit system with respect to the d-axis current.

Similarly, a closed loop transfer function Gqcl(s) for the q-axis current is given by reference to FIG. 3B and by the equations (19), (21), (24) and (25).

$$Gqcl(s)=Gqpi(s) \cdot Gqm(s)/\{1+Gqpi(s) \cdot Gqm(s)\}=K2 \cdot Km/(s+K2 \cdot Km) \tag{28}$$

In this case, if K2·Km=Rq/Lq is put, $$Gqcl(s)=Rq/(Lq \cdot s+Rq) \tag{29}$$

As is seen from a comparison between the equations (29) and (19), the current control system has similar frequency characteristics to those of the motor-driving circuit system with respect to the q-axis current.

The coefficients K1 and K2 in the proportional gain and the integral gain as shown by the equations (22)–(25) above are normally set so that K1=K2 is satisfied and from the equations (26) and (28), the closed loop transfer function Gdcl(s) for the d-axis current and the closed loop transfer function Gqcl(s) for the q-axis current are equalized in this case, irrespective of the values of K1 and K2 themselves, so that the responses of the currents of both axes are matched with each other.

<2.5 Method of Obtaining Characteristic Values for Use in Setting Control Parameters>

As shown by the equations (22)–(25) according to the embodiment of the invention, since the setting of the control parameters (proportional gain Kdp and integral gain Kdi) of the d-axis current PI control portion 126 is based on the d-axis inductance Ld and the d-axis resistance Rd and since the setting of the control parameters (proportional gain Kqp and integral gain Kqi) of the q-axis current PI control portion 128 is based on the q-axis inductance Lq and the q-axis resistance Rq, it is necessary to obtain these characteristic values Ld, Rd, Lq and Rq. A method of obtaining these characteristic values Ld, Rd, Lq and Rq will be described below.

The motor 6 is a kind of cylindrical permanent magnet synchronous motor and inductance in the corresponding phases of the brushless motor is normally given as follows (see Non-Patent Document 1, for example).

$$Lu = la + La - Las \cdot \cos(2 \cdot \theta re) \quad (30a)$$

$$Lv = la + La - Las \cdot \cos(2 \cdot \theta re + 2\pi/3) \quad (30b)$$

$$Lw = la + La - Las \cdot \cos(2 \cdot \theta re - 2\pi/3) \quad (30c)$$

wherein Lu=u-phase inductance, Lv=v-phase inductance, Lw=w-phase inductance, la=leakage inductance, La=mean values of effective inductance and Las=amplitude of effective inductance.

According to the embodiment of the invention, the u-phase, v-phase and w-phase inductance Lu, Lv and Lw of the motor 6 at every kind of electrical angle θre is measured whereby to calculate the leakage inductance la, the mean values La of the effective inductance and the amplitude Las of the effective inductance from the measured results according to the equations (30a)–(30c). Further, the characteristic values la, La and Las thus obtained are used to calculate the d-axis inductance Ld and the q-axis inductance Lq according to the following equation based on the coordinate transformation between the three-phase AC coordinates and the d-q coordinates.

$$Ld = la + (2/3) \cdot (La - Las) \quad (31)$$

$$Lq = la + (2/3) \cdot (La + Las) \quad (32)$$

Then the frequency characteristics of the open loop transfer function of the motor-driving circuit system are measured and as it is utilizable that the motor-driving circuit system is regarded as a time-lag-of-first-order transfer element determined by inductance and resistor, the d-axis resistance Rd and the q-axis resistance Rq of the motor-driving circuit system are calculated from the measured results of the frequency characteristics of the open loop transfer function and the inductance Ld and Lq thus calculated above. Given that R designates the internal resistance in the corresponding phase of the motor 6 and that R' designates the external resistance in the corresponding phase including wiring resistance, connector resistance and the like in the motor-driving circuit system, the d-axis resistance Rd and the q-axis resistance Rq thus obtained are given by the following equation:

$$Rd = R + R' \quad (33)$$

$$Rq = R + R' \quad (34)$$

Figure 8:
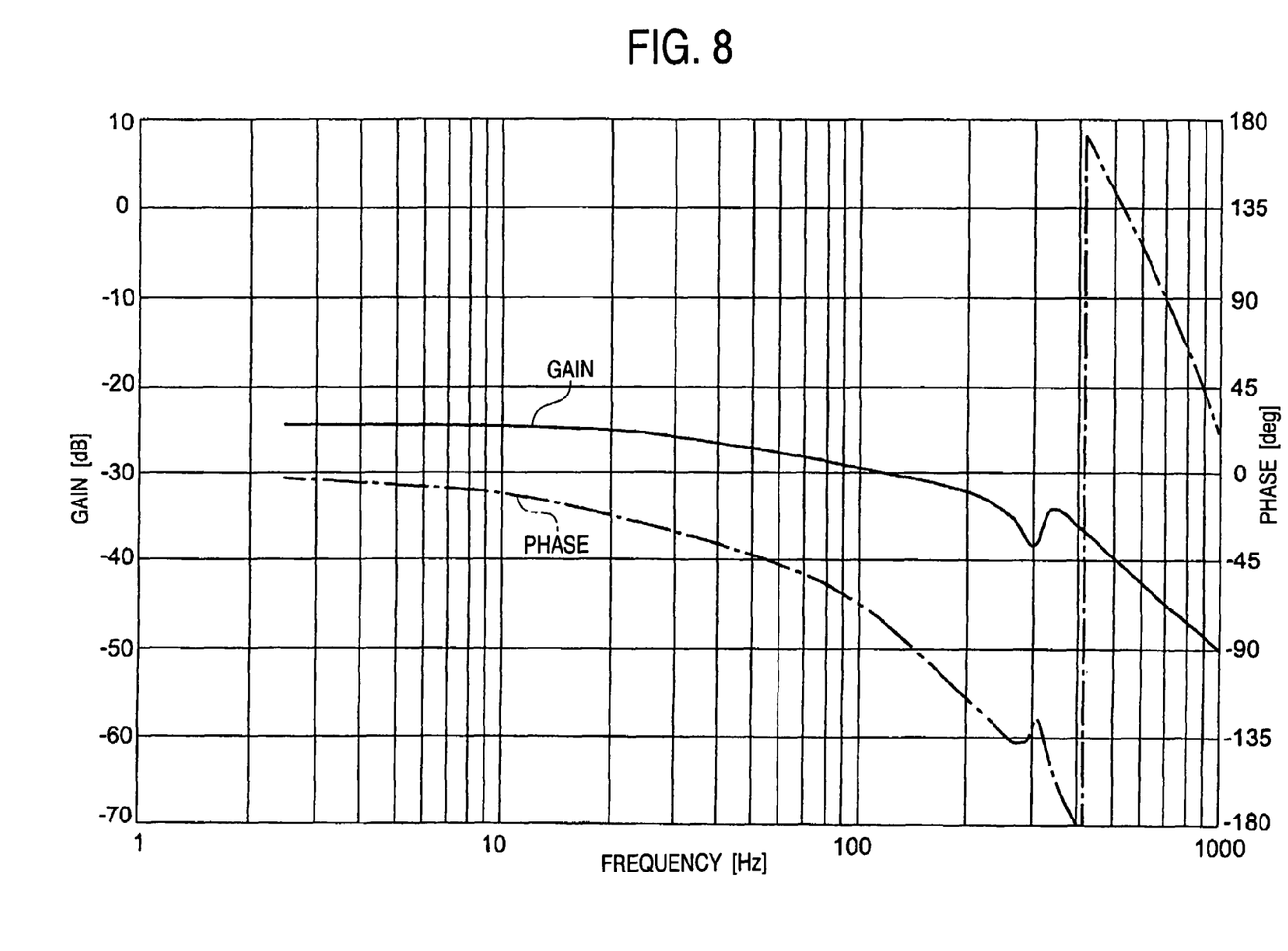
FIG. 8 is a Bode diagram showing frequency characteristics of q-axis current in the current control system of the electric power steering apparatus according to the embodiment of the invention.
Figure 9:
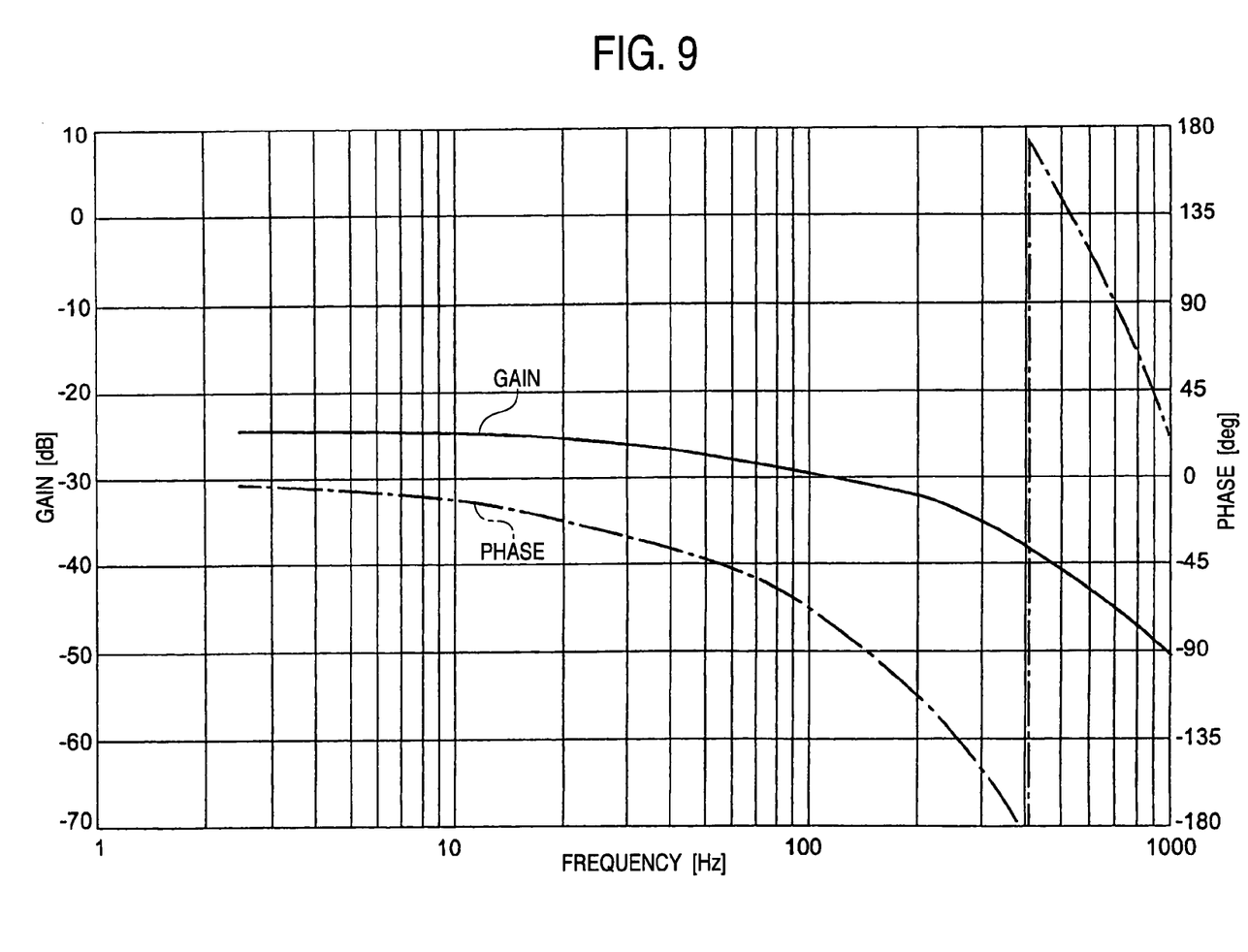
FIG. 9 is a Bode diagram showing frequency characteristics of d-axis current in the current control system of the electric power steering apparatus according to the embodiment of the invention.

According to the embodiment of the invention, the setting of the proportional gain Kdp and the integral gain Kdi as the control parameters of the d-axis current PI control portion 126 is based on the d-axis inductance Ld and the d-axis resistance Rd thus obtained above. At the same time, the setting of the proportional gain Kqp and the integral gain Kqi as the control parameters of the q-axis current PI control portion 128 is based on the q-axis inductance Lq and the q-axis resistance Rq (equations (20)–(25)). FIG. 8 is a Bode diagram with respect to q-axis current in the current control system by way of example according to the embodiment of the invention and FIG. 9 is a Bode diagram with respect to d-axis current in the example above. These Bode diagrams show that the frequency characteristics of the q-axis current and the frequency characteristics of the d-axis current in the current control system are matched with each other in the frequency range in which the electric power steering apparatus is actually used.

<2.6 Effect>

In the conventional electric power steering apparatus using the cylindrical permanent magnet synchronous motor, the current control has been performed on regarding the d-axis inductance and the q-axis inductance of the motor as equal to each other. According to the embodiment of the invention, the d-axis inductance and the q-axis inductance of the cylindrical permanent magnet synchronous motor 6 are obtained, based on which the transfer functions of the d-axis current PI control portion 126 and the q-axis current PI control portion 128 are set (see equations (20)–(25)), whereupon it is possible to match the frequency characteristics of the d-axis current with the frequency characteristics of the q-axis current (see FIGS. 8 and 9). Therefore, current control fit for the motor characteristics is feasible in comparison with the case where the conventional electric power steering apparatus using the cylindrical permanent magnet synchronous motor, so that the performance of the motor can be brought out more than before with possible improvement in the response of the current control system.

According to the embodiment of the invention, as the current control system has been designed in consideration of the motor 6 and the external resistance R' including the wiring resistance of the motor driving circuit 152 (equations (20)–(25), (33) and (34)), the current control system is allowed to have frequency characteristics similar to the frequency characteristics of the motor-driving circuit system (equations (27 and (29)). Therefore, in combination with matching the frequency characteristics of the d-axis current with the frequency characteristics of the q-axis current, the highest possible performance of the motor 6 can be brought out.

Incidentally, the proportional gain of the PI control portion is increased and phase compensation is provided in the conventional electric power steering apparatus to raise its response characteristics, so that the gain characteristics of the current control system have a peak in the high frequency band. According to the above embodiment of the invention, on the contrary, since the original performance of the motor can be brought out by the current control system thus arranged, the proportional gain for improving the response need not be increased unnecessarily and phase compensation also need not be effected unnecessarily. Consequently, the peak of the gain characteristics is not seen in the high frequency band and this results in reducing control sound and vibration.

According to the above embodiment of the invention, further, though the d-axis voltage command value $v^*_d$ and the q-axis voltage command value $v^*_q$ are calculated by the proportional integral control operation as shown in equations (20) and (21), the invention is still applicable with the same effect even when the d-axis voltage command value $v^*_d$ and the q-axis voltage command value $v^*_q$ are calculated by other control operations instead (e.g., proportional integral differential control operations (PID control operations).

What is claimed is:

1. An electric power steering apparatus for giving steering auxiliary power to a steering mechanism of a vehicle by driving, by introducing d-q coordinates as a rotary coordinate system having a d-axis as a direction of magnetic flux of a rotary field system of the motor and a q-axis perpendicular to the d-axis, a cylindrical permanent magnet synchronous motor which is a driving source in response to a value on the d-q coordinates of a motor driving current command value, the apparatus comprising:
    a d-axis current control unit which calculates a d-axis voltage command value for driving the motor by a control operation based on a d-axis component of the motor driving current command value;
    a q-axis current control unit which calculates a q-axis voltage command value for driving the motor by a control operation based on a q-axis component of the motor driving current command value;
    a coordinate transformation unit which transforms the d-axis voltage command value and the q-axis voltage command value to voltage command values in corresponding phases of the motor; and
    a motor driving circuit which drives the motor according to the voltage command values in the corresponding phases, wherein:
    control parameters of the d-axis current control unit are set on the basis of the d-axis inductance of the motor; and
    control parameters of the q-axis current control unit are set on the basis of the q-axis inductance of the motor.

2. The electric power steering apparatus according to claim 1, wherein
    the control parameter of the d-axis current control unit is set on the basis of the d-axis inductance of the motor and d-axis resistance as a d-axis quantity of the resistance of a motor-driving circuit system comprising the motor and the motor driving circuit;
    the control parameter of the q-axis current control unit is set on the basis of the q-axis inductance of the motor and q-axis resistance as a q-axis quantity of the resistance of the motor-driving circuit system; and
    the d-axis resistance and the q-axis resistance are determined by a internal resistance of the motor and external resistance including wiring resistance of the motor and the motor driving circuit.

3. The electric power steering apparatus according to claim 2, wherein:
    the d-axis current control unit calculates the d-axis voltage command value by carrying out proportional integral control operations on a deviation of the d-axis component of the motor driving current command value from a d-axis component of the value of current flowing through the motor;
    the q-axis current control unit calculates the q-axis voltage command value by carrying out proportional integral control operations on a deviation of the q-axis component of the motor driving current command value from a q-axis component of the value of current flowing through the motor; and
    a proportional gain Kdp and an integral gain Kdi as the control parameters of the d-axis current control unit, and a proportional gain Kqp and an integral gain Kqi as the control parameters of the q-axis current control unit are set in according with the following equation:

$Kdp=K1 \cdot Ld$, $Kdi=K1 \cdot Rd$ $Kqp=K2 \cdot Lq$ and $Kqi=K2 \cdot Rq$ where Ld=the d-axis inductance, Lq=the q-axis inductance, Rd=the d-axis resistance and Rq=the q-axis resistance with Rd=Rq=R+R' where R=the internal resistance, R'=the external resistance, and K1 and K2=optional coefficients.

4. The electric power steering apparatus according to claim 1, wherein a d-axis current detection value is substantially equal to a d-axis current command value.

5. The electric power steering apparatus according to claim 1, wherein a q-axis current detection value is substantially equal to a q-axis current command value.

6. An electric power steering apparatus that provides auxiliary power to a steering mechanism of a vehicle, the apparatus comprising:
    a brushless motor operably connected to steering system of the vehicle;
    a sensor connected to the brushless motor, the sensor providing d-q coordinates as a rotary coordinate system having a d-axis as a direction of magnetic flux of a rotary field system of the motor and a q-axis perpendicular to the d-axis; and
    a controller operably connected to the motor, the steering system and the sensor, the controller comprising:
        a d-axis current control unit which calculates a d-axis voltage command value for driving the motor by a control operation based on an inductance of the d-axis component of the motor;
        a q-axis current control unit which calculates a q-axis voltage command value for driving the motor by a control operation based on an inductance of the q-axis component of the motor;
        a coordinate transformation unit which transforms the d-axis voltage command value and the q-axis voltage command value to voltage command values in corresponding phases of the motor; and
        a motor driving circuit which drives the motor according to the voltage command values in the corresponding phases, wherein the controller matches frequency characteristics of a d-axis current and a q-axis current with a frequency range in which the electric power steering apparatus is used.

7. The electric power steering apparatus according to claim 6, wherein
    the d-axis current control unit which calculates the d-axis voltage command value for driving the motor by a control operation based on an internal and an external resistance of the motor, and the q-axis current control unit which calculates the q-axis voltage command value for driving the motor by a control operation based on an internal and an external resistance of the motor.

8. The electric power steering apparatus according to claim 6, wherein
the d-axis voltage command value is calculated by a proportional integral operation based on the d-axis inductance and a d-axis resistance, including an external resistance, and
the q-axis voltage command value is calculated by a proportional integral operation based on the q-axis inductance and a q-axis resistance, including an external resistance.

9. The electric power steering apparatus according to claim 7, wherein the external resistance comprises at least one of a wiring resistance of the motor and the motor driving circuit of the controller.

10. The electric power steering apparatus according to claim 6, wherein the controller further comprises:
a current control portion that cancels a deviation of a d-axis current command value from a d-axis current detection value, and cancels a deviation of a q-axis current command value from a q-axis current detection value.

11. An electric power steering apparatus that provides auxiliary power to a steering mechanism of a vehicle, the apparatus comprising:
a brushless motor operably connected to steering system of the vehicle;
a sensor connected to the brushless motor, the sensor providing d-q coordinates as a rotary coordinate system having a d-axis as a direction of magnetic flux of a rotary field system of the brushless motor and a q-axis perpendicular to the d-axis; and
a controller operably connected to the brush less motor, the steering system and the sensor, the controller comprising:
a d-axis current control unit which calculates a d-axis voltage command value for driving the brushless motor by a control operation based on an inductance of the d-axis component of the brushless motor and an internal resistance of the brushless motor and an external resistance;
a q-axis current control unit which calculates a q-axis voltage command value for driving the brushless motor by a control operation based on an inductance of the q-axis component of the brushless motor and an internal of the brushless motor and an external resistance;

a coordinate transformation unit which transforms the d-axis voltage command value and the q-axis voltage command value to voltage command values in corresponding phases of the motor; and
a motor driving circuit which drives the motor according to the voltage command values in the corresponding phases, wherein the controller matches frequency characteristics of a d-axis current and a q-axis current with a frequency range in which the electric power steering apparatus is used.

12. The electric power steering apparatus according to claim 11, wherein the external resistance comprises at least one of a wiring resistance of the motor and a motor driving circuit of the controller.

13. The electric power steering apparatus according to claim 11, wherein:
the d-axis current control unit calculates the d-axis voltage command value by carrying out proportional integral control operations on a deviation of the d-axis component of the motor driving current command value from a d-axis component of the value of current flowing through the motor;
the q-axis current control unit calculates the q-axis voltage command value by carrying out proportional integral control operations on a deviation of the q-axis component of the motor driving current command value from a q-axis component of the value of current flowing through the motor; and
a proportional gain Kdp and an integral gain Kdi as the control parameters of the d-axis current control unit, and a proportional gain Kqp and an integral gain Kqi as the control parameters of the q-axis current control unit are set in according with the following equation:

$Kdp = K1 \cdot Ld,$ $Kdi = K1 \cdot Rd$ $Kqp = K2 \cdot Lq$ and $Kqi = K2 \cdot Rq$ where Ld=the d-axis inductance, Lq=the q-axis inductance, Rd=the d-axis resistance and Rq=the q-axis resistance with Rd=Rq=R+R' where R=the internal resistance, R'=the external resistance, and K1 and K2=optional coefficients.

* * * * *